(12) United States Patent
Mannheim Astete et al.

(10) Patent No.: US 9,950,944 B2
(45) Date of Patent: Apr. 24, 2018

(54) CURVED BULLET PROOF GLASS MADE OF GLASS, GLASS-CERAMIC OR CERAMIC MECHANICALLY CURVED ON THE STRIKE-FACE LAYER

(71) Applicant: AGP AMERICA S.A., Panama (PA)

(72) Inventors: Mario Arturo Benjamin Mannheim Astete, Bogota D.C. (CO); Juan Pablo Suarez Cuervo, Bogota D.C. (CO); Juvenal Tobias Benitez Palmeth, Bogota D.C. (CO); Juan Carlos Espinosa Rojas, Bogota D.C. (CO); Maria Carolina Montaño Forero, Bogota D.C. (CO)

(73) Assignee: AGP AMERICA S.A., Panama (PA)

( * ) Notice: Subject to any disclaimer, the term of this patent is extended or adjusted under 35 U.S.C. 154(b) by 4 days.

(21) Appl. No.: 14/463,784

(22) Filed: Aug. 20, 2014

(65) Prior Publication Data
US 2016/0023938 A1   Jan. 28, 2016

Related U.S. Application Data

(62) Division of application No. 13/611,628, filed on Sep. 12, 2012, now Pat. No. 8,865,300.

(51) Int. Cl.
*C03B 23/025* (2006.01)
*B32B 17/10* (2006.01)
*F41H 5/04* (2006.01)

(52) U.S. Cl.
CPC .... *C03B 23/0256* (2013.01); *B32B 17/10064* (2013.01); *B32B 17/10137* (2013.01); *C03B 23/0258* (2013.01); *F41H 5/0407* (2013.01); *Y10T 156/1002* (2015.01); *Y10T 428/24959* (2015.01); *Y10T 428/26* (2015.01)

(58) Field of Classification Search
CPC .............. C03B 23/023; C03B 23/0256; C03B 23/0258; C03B 23/03; C03B 23/0302; C03B 23/0305; C03B 23/0066
USPC .......................................... 65/287, 106–107
See application file for complete search history.

(56) References Cited

U.S. PATENT DOCUMENTS

| | | | | |
|---|---|---|---|---|
| 3,403,991 A | * | 10/1968 | Comperatore | C03B 23/0258 65/107 |
| 4,018,589 A | * | 4/1977 | Egbert | C03B 23/0252 65/287 |
| 5,622,580 A | * | 4/1997 | Mannheim | B32B 17/10018 100/295 |
| 5,773,148 A | * | 6/1998 | Charrue | C03C 3/085 428/410 |
| 7,875,565 B1 | | 1/2011 | Pinckney | |
| 8,088,472 B2 | * | 1/2012 | Mannheim Astete | B32B 17/10045 428/212 |

(Continued)

FOREIGN PATENT DOCUMENTS

| | | |
|---|---|---|
| WO | 2007/032961 | 3/2007 |
| WO | 2011/049893 | 4/2011 |

*Primary Examiner* — Erin Snelting
(74) *Attorney, Agent, or Firm* — Jacobson Holman, PLLC (57) ABSTRACT

A curved bullet-proof composite comprising:
a glass or glass-ceramic external strike-face layer having been subjected to an ion exchange process and which is mechanically curved; at least one glass or glass-ceramic intermediate layer; an internal plastic layer; and an adhesive material between the strike-face layer, the at least one intermediate layer and the internal plastic layer.

6 Claims, 8 Drawing Sheets (56) References Cited

U.S. PATENT DOCUMENTS

| | | | |
|---|---|---|---|
| 9,156,679 B1* | 10/2015 | Zeyen | H01L 31/0203 |
| 2007/0068375 A1* | 3/2007 | Jones | B32B 17/10009 |
| | | | 89/36.02 |
| 2008/0032104 A1* | 2/2008 | Mannheim Astete | B32B 17/10045 |
| | | | 428/215 |
| 2009/0136702 A1 | 5/2009 | Gu | |
| 2010/0275767 A1 | 11/2010 | Pinckney | |
| 2012/0028015 A1* | 2/2012 | Langsdorf | F41H 5/0407 |
| | | | 428/215 |

* cited by examiner

CURVED BULLET PROOF GLASS MADE OF GLASS, GLASS-CERAMIC OR CERAMIC MECHANICALLY CURVED ON THE STRIKE-FACE LAYER

1. FIELD OF THE INVENTION

The present invention is related to the manufacture of curved bullet-proof composites which incorporate glass, glass-ceramics or transparent ceramics on the strike-face layer, wherein the curvature of the materials used on the strike-face layer is obtained mechanically during the pressure and temperature (heat) lamination process.

2. DESCRIPTION OF THE ART

A conventional bullet-proof composite is comprised of a set of different Soda-Lime[1] layers, which are found bound together by layers of adhesives which generally are polymers, and in general have a polycarbonate layer on the inside part of the composite.

[1] Soda-Lime glass is the English name given to sodium-calcium glass, which for window applications has the following chemical composition; the chemical composition of the type of glass depending of the manufacturer: 73% $SiO_2$, 14% $Na_2O$, 9% CaO, 4% MgO, 0.15% $Al_2O_3$, 0.03% $K_2O$, 0.02% $TiO_2$ and 0.1% $Fe_2O_3$. Taken from http://en.wikipedia.org/wiki/Soda-lime_glass on 13 Mar. 2012.

Figure 1:
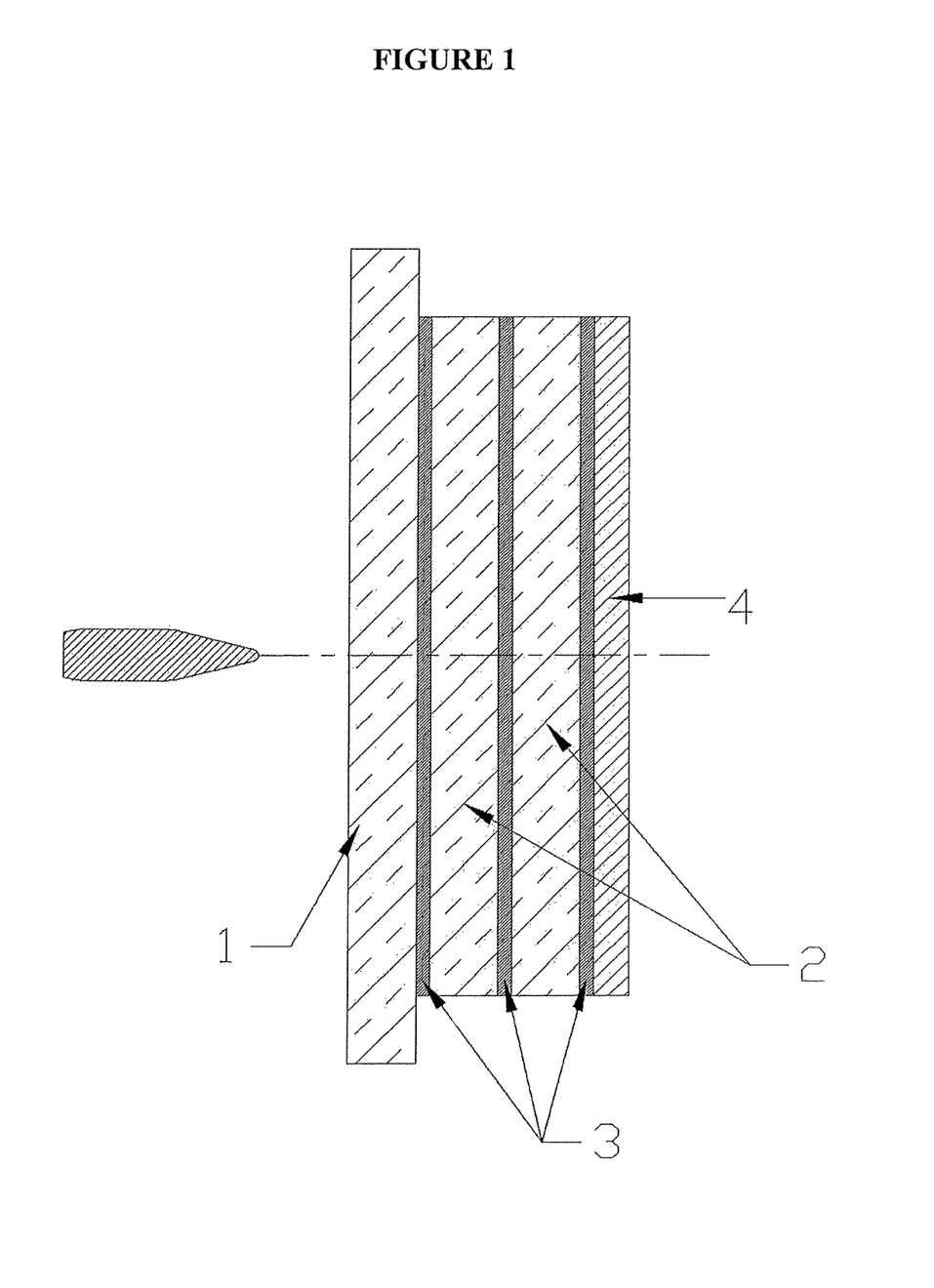
FIG. 1 shows a cross section of an example of a design of a transparent glass bullet-proof composite.

Making reference to FIG. 1, the architecture of a bullet-proof composite commonly found in the art is shown. Starting from outside to inside ("outside" meaning the space from where a bullet is normally shot from; likewise, "inside" refers to the space protected by the bullet-proof composite), an strike-face glass layer (1) which receives the projectile impact is found, which is fixed to other glass intermediate layers by means of several adhesive layers (3) and an internal layer (4) made of any high impact resistance plastic material. Other materials different than the traditional Soda-Lime glass have been incorporated in the strike-face glass layer (1) in recent bullet-proof designs.

For example, WO2007/032961 A2 considers the use of Lithium Aluminum Silicate (LAS) in the strike-face layer (1) of FIG. 1. Likewise, PCT/US2010/053106, U.S. Pat. No. 7,875,565 and US2010/0275767 contemplate the use of Glass-Ceramics[2] in the strike-face layer (1). Other transparent ceramic materials considered for the strike-face layer (1) of the bullet-proof composite comprise: Aluminum Oxynitride (ALON), Single Crystal Aluminum Oxide (Sapphire) and Spinel (MgAl2O4). However, ceramic materials are not massively used in designing and manufacturing bullet-proof glass due to the high cost of these materials in comparison to Soda-Lime glass, Borosilicate glass and glass-ceramics, as set forth in patent application US2010/0275767. The ceramic cost may be 2500 fold higher than Soda-Lime glass, 115 fold higher than Borosilicate glass and 30 times more expensive than glass-ceramics. One of the most relevant mechanical properties considered for the selection of material to be used in the strike-face layer of the composite of bullet-proof glass is hardness. Hardness could be understood as a measure of how much force is required to permanently change the shape of a material. In this sense, a harder material can erode or remove material from a softer material. In the present invention, it is desired to have harder materials as the strike-face layer in order to erode the projectile materials, strip mass away from it and thus reduce its kinetic energy.

[2] Glass-ceramics or Vitrouos-ceramics are materials whose molecular structure are part crystalline and part amorphous. Currently, Lithium Aluminum silicate (LAS), Alkali Aluminum silicate (SAS) and others are marketed.

The primary differences between glass, glass-ceramics and ceramics considered candidates to be introduced in bullet-proof composites are: molecular structure, transparency and hardness. As such, glass molecular structure is entirely amorphous and thus no organized molecular array exists; the above feature makes glass transparent throughout the entire visible light spectrum. With regards to glass-ceramics, a hybrid molecular structure exists, part amorphous and part crystalline, and thus, transparency of these materials within the visible light range is lesser to that of glass, and hardness of these materials is greater than glass hardness. Furthermore, transparent ceramic materials have a crystalline molecular structure and superior hardness compared to glass and glass-ceramics. Transparency of these materials is limited. Two of the top disadvantages of transparent ceramic materials which can be included in bullet-proof composites are their high cost and restricted availability of large sizes (areas less than 0.5 $m^2$).

Continuing with FIG. 1, the material conventionally used in the glass intermediate layers (2) is the same glass used in the strike-face glass layer (1). However, with the new concept of using a material harder than glass (Soda-Lime or Borosilicate) in the strike-face layer (1), efficient use of glass has been found in the intermediate layers (2) of FIG. 1. The number and thickness of intermediate layers (2) used in the bullet-proof composite depends on the what type of ammunition needs to be stopped, and hence, the more kinetic energy the projectile carries, the more number of intermediate layers needed or a greater thickness thereof. The use of Borosilicate[3] glass as an intermediate layers (2) could represent an advantage of bullet proof composites design since Borosilicate glass has a less density than Soda-Lime glass and thus, contributes to the area density reduction of ballistic formulations. However, the cost of Borosilicate glass is greater than the cost of Soda-Lime glass. No evidence is found in prior art of curved bullet-proof composites wherein the material used in the strike-face layer (1) and intermediate layers (2) is the same type of glass-ceramic or wherein the glass-ceramic used in the strike-face layer (1) is different than the glass-ceramic used in intermediate layers (2). Likewise, no evidence is found in prior art of curved ballistic composites with multi-layers wherein ceramic materials are used in the strike-face layer (1) and in the intermediate layers (2).

[3] Borosilicate glass, like Soda-Lime glass, has an entirely amorphous molecular structure, density of 2.2 $g/cm^3$ and an its approximate chemical composition is: 70% silica, 10% boron oxide, 8% sodium oxide, 8% potassium oxide and 1% calcium oxide. The amount of boron oxide is greater in this glass than in Soda-Lime glass.

As mentioned above, the adhesive layers (3) function in bonding layers (1), (2) and (4). These layers also reduce the spreading of cracks and increase the bullet-proof composite's capability to resist multiple impacts by maintaining together all layers making up the composite, as described in patent No. US2009/0136702. Materials most used to bond layers are: polyurethane (PU), ethylene vinyl acetate (EVA), ionomers, and polyvinyl butyrate (PVB), or special PVB, PU or other polymers.

The internal layer (4) functions in containing the strike-face layer (1) splinters and those of intermediate layers (2) generated during impacts and absorb residual kinetic energy which the projectile maintains after going through the strike-face layer (1), the intermediate layers (2) and the adhesive layers (3). The way the internal layers (4) absorb energy is by means of plastic deformation (strain); the material conventionally used in the internal layer (4) is polycarbonate. Other materials, which may be used in the internal layer (4)

are: different types of polyacrylates, polyethylenes, polyureas, rigid polyurethanes and polyesters, as illustrated in US2010/0275767.

The manufacturing process of curved bullet-proof composites using Soda-Lime or Borosilicate glass or other ceramic or glass-ceramic in the strike-face layer (1) and the intermediate layers (2) (FIG. 1), involve the following critical steps:

a) size (cut) glass or glass-ceramic in the strike-face layer (1) and intermediate layers (2) to the geometry or shape of the curved bullet-proof composite. Sinter the ceramic material of the strike-face layer (1) according to the shape of the curved bullet-proof composite sought to manufacture.

b) grinding the edge of the glass, glass-ceramic or ceramic, i.e., strike-face layer (1) and intermediate layers (2);

c) paint the black band using glass enamels, which are a type of inorganic paint, on the glass used in the strike-face layer (1) and/or one of the glasses used in the intermediate layers (2);

d) simultaneously curve by means of gravity and temperature the strike-face layer (1) and the intermediate layers (2);

e) carryout an ion exchange process of one or several glass and/or glass-ceramics of the strike-face layer (1) and intermediate layers (2);

f) assemble the strike-face layer (1), intermediate layers (2), adhesive layers (3) and the internal layer (4); and g) pressure and temperature (heat) laminate the strike-face layer (1), intermediate layers (2), adhesive layers (3) and the internal layer (4); pressure and temperature curve the internal layer (4).

a) Adjust (size) glass or glass-ceramic strike-face layer (1) and intermediate layers (2) to the shape of the curved bullet-proof composite. Sinter ceramic material of the strike-face layer (1) according to the shape of the curved bullet-proof composite sought to manufacture: glass and transparent glass-ceramics which can be used in the strike-face layer (1) and intermediate layers (2) in FIG. 1 are obtained as large flat sheets (roughly 2 m×3 m). The above in order to increase glass or glass-ceramic manufacturer productivity, guarantee sheet flatness and maintain good optic properties. Bullet-proof glass manufacturing companies must cut flat sheets received from the glass or glass-ceramic manufacturers in order to obtain the number of layers in sizes and shapes required for the pieces intended for production. In contrast to glass or glass-ceramics, ceramics must be manufactured in the final size and shape required due to the difficulty of machining these materials due to their hardness.

b) Grinding the edge of the glass, glass-ceramic or ceramic: after the cutting process of materials incorporated in the strike-face layer (1) and intermediate layers (2) (FIG. 1), the edges must be grinded. The purpose of this grinding process is to reduce the size of cracks generated during cutting of glass and glass-ceramics. Grinding the edges reduces the risk of ruptures due to the presence of defects. Ceramic materials must be provided with edge finishing.

c) Paint the black stripe using glass enamels on the glass used in the strike-face layer (1) and/or one of the glasses used in the intermediate layers (2): curved bullet-proof composites for automobile use require a black stripe at the perimeter, having two primary objectives. The first objective is absorbing UV sunlight to which vehicles are subject to when outside, since this light denatures the adhesives used for fixing the bullet-proof composites to the vehicle bodywork and compromises the bullet-proof composite/bodywork bond. The perimeter black stripe absorbs UV sunlight and avoids said sunlight reaching the adhesives in order to guarantee that the bullet-proof composite remains adhered to vehicle bodyworks. The second objective of the perimeter black stripe of the bullet-proof composites is esthetic, since it hides the bond between the strike-face layer (1) and intermediate layers (2) which comprise the bullet-proof composite. Therefore, determining for what type of ammunition said bullet-proof composite was designed for by a mere outside visual inspection of the vehicle can be avoided. The greatest disadvantage of painting the perimeter black stripe in bullet-proof composite using glass enamels is the loss of mechanical resistance in glass when painted using this type of paint. When painting annealed glass (absence of internal stresses) using glass enamels, it loses about 60% of its mechanical resistance, and hence, bullet-proof manufacturers design bullet-proof composites having high thickness in the strike-face layer (1); glass having thicknesses greater than 4 mm in the strike-face layer (1) are conventionally used in order to resist the weight of all the piece and stresses generated when the vehicle is moving.

Figure 3:
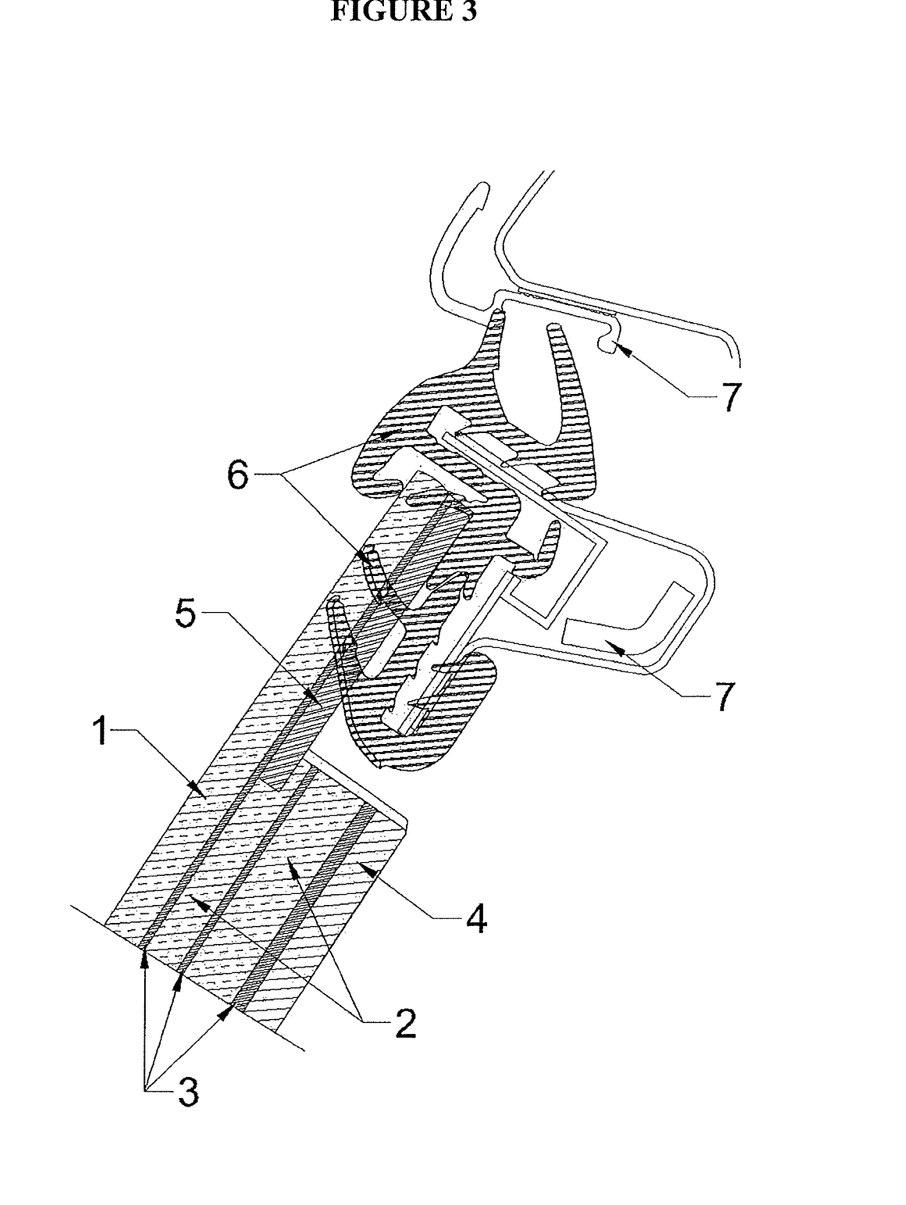
FIG. 3 sketches the way a flange-containing curved bullet-proof composite can be assembled onto the door of a vehicle.
Figure 4:
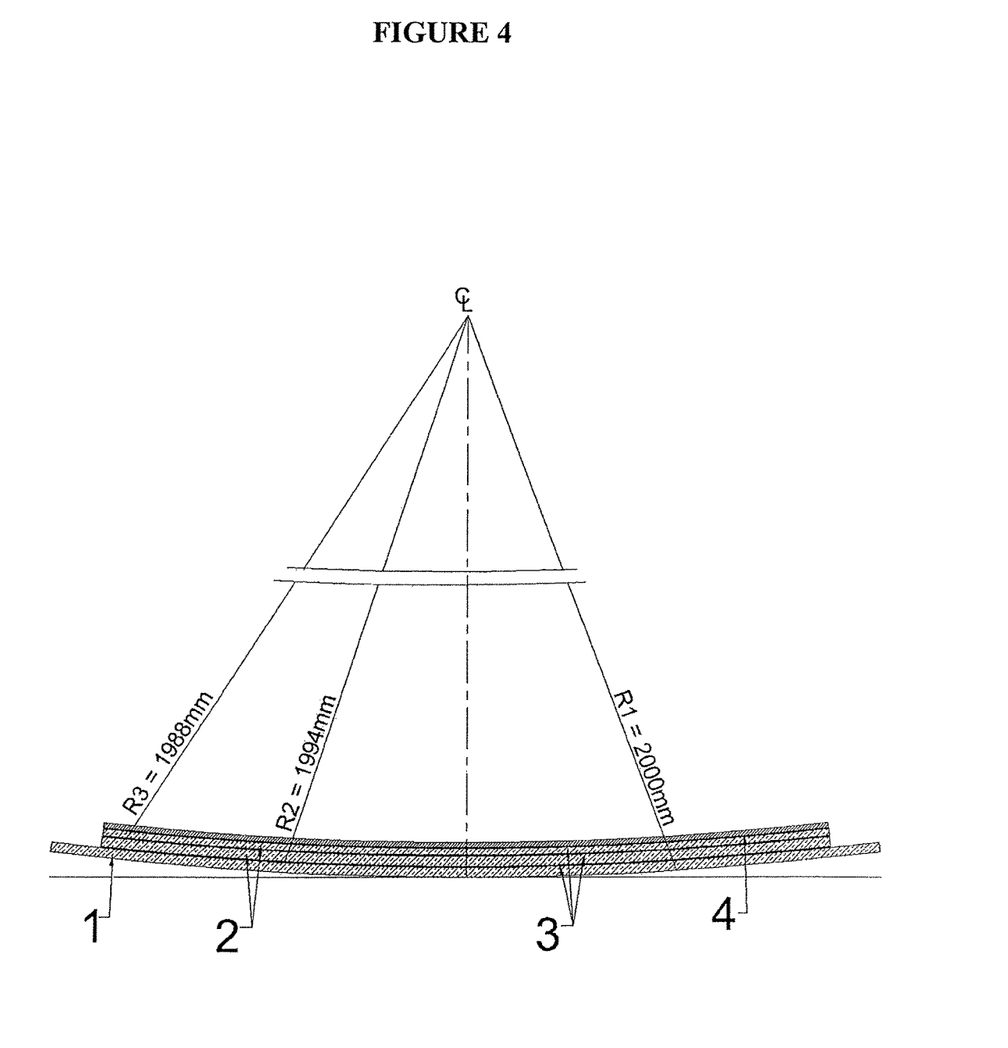
FIG. 4 illustrates the way curvature radii are measured of the different material layers comprising a curved bullet-proof composite.

The use of glass enamels for manufacturing the black stripe is preferred by bullet-proof glass manufacturers because said paints possess a high resistance to scratches, which allows for a glass having a flange (strike-face layer (1), i.e., glass of greater size than the glass of intermediate layers (2), as illustrated in FIG. 1) to be easily installed in bodyworks of bullet-proof cars. Flanges of glass painted with glass enamels can be installed in direct contact with vehicle bodywork without any high risk of scratches of the black stripe. Bullet-proof vehicle assembling companies prefer that the glass thickness used in the strike-face layer (1) be the same thickness as the glass with which the vehicles were originally made with, since this feature allows for installing bullet-proof composite in vehicle bodyworks without the need of making bodywork modifications. FIG. 3 illustrates the way how a bullet-proof composite having a flange is assembled onto a vehicle door; the strike-face layer (1), intermediate layers (2), adhesive layers (3) and the internal layer (4) comprising the bullet-proof composite can be appreciated. In addition, the perimeter black stripe is shown; the glass enamels thickness is not proportional to the thickness of the other components in the drawing, the gasket (6) used to seal the interior of the vehicle from the exterior when the bullet-proof composite is found in the top position and the door interior and exterior panel (7).

d) Simultaneously curve by means of gravity and temperature the strike-face layer (1) and the intermediate layers (2): once the glass and/or glass-ceramic strike-face layer (1) and intermediate layers (2) to be used in the ballistic composite are sized and grinded, these must be curved. The bending process of the strike-face layer (1) and intermediate layer (2) glass and glass-ceramic must assure perfect parallelism amongst layers to be used. In FIG. 4, a glass layer array configuration is schematically shown which comprises a bullet-proof composite in order to be curved by gravity and temperature. As shown in FIG. 4, the bullet-proof composite is comprised of glass in the strike-face layer (1) and two layers of the same type of glass used in the strike-face layer (1) and intermediate layers (2). During the simultaneous gravity and temperature bending process, each one of the glass layers comprising the piece foul' a determined curvature radius, calculated from the same center. For example: the strike-face layer (1) glass layer forms a curvature radius of 2000 mm, one of the intermediate layer (2) glass layers forms a curvature radius of 1994 mm and the other a curvature radius of 1988 mm. The difference between curvature radii is necessary to ensure parallelism between layers and reduce the risk of ruptures during the pressure and temperature lamination process.

FIG. 4 illustrates how the curvature radii are calculated in each of the glass, glass-ceramic or ceramic layers which will be used in the bullet-proof composite; as noted, the curvature radius in each layer is different. Simultaneous gravity and temperature bending wherein glass and glass-ceramics are curved and annealed is commonly used during bullet-proof composite production which use the same type of glass and glass-ceramic in the strike-face layer (1) and in the intermediate layers (2) (FIG. 1) because it increases the odds of having entirely parallel layers, avoiding generating spacing which cause ruptures during the pressure and temperature lamination process. Ceramic materials in contrast with glass and glass-ceramics are not curved by gravity and temperature but instead are sintered with the final shape to be used in the curved glass bullet-proof composites.

Figure 5:
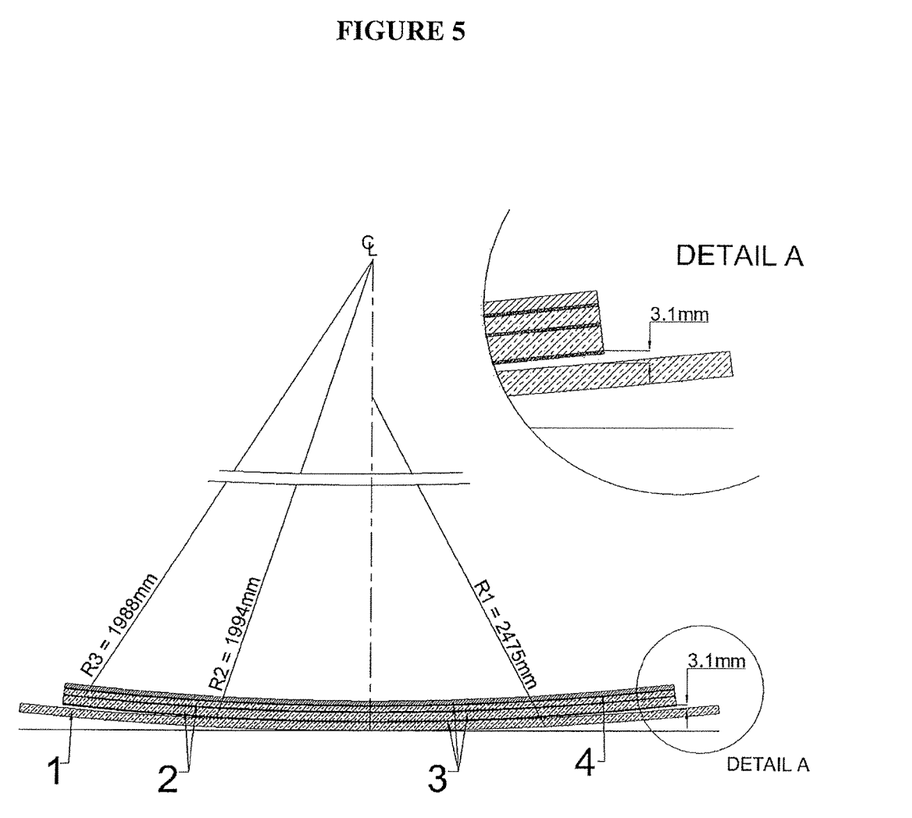
FIG. 5 shows the lack of parallelism between material layers occupying the strike-face layer (1) and the intermediate layers (2) in a deficient bending process.

FIG. 5, by using the same ballistic composite as FIG. 4, is an example of how a lack of parallelism can be generated between glass layers simultaneously curved by means of gravity and temperature. As may be noted in FIG. 5, the glass layer in position (1) did not reach a curvature radius of 2000 mm required to ensure parallelism between layers, but on the contrary, took a curvature radius of 2475 mm. Due to the above, this generates spacing between layers representing high risk of rupture during the lamination process. FIG. 5 also shows in "Detail A" (sliced) the space between glass layers in the strike-face layer (1) and intermediate layers (2) which can be of up to 3.1 mm. When the glass or glass-ceramic layers have spaces like those mentioned above (3.1 mm), the risk of a rupture increases when undergoing pressure and temperature lamination because glass and glass-ceramics are fragile materials which do not have a high degree of deformation. The spacing between layers allows for glass and/or glass-ceramics to deform during lamination and produce ruptures. Another possible defect generated due to the lack of parallelism between layers is optical distortion (magnifying effect) generated when the spaces formed between glass layers curved by gravity and temperature are sufficiently small for glass layers not to break during lamination but instead generate the mentioned optical distortion, which is an undesired defect in bullet-proof composites for automobile applications.

Plastic materials used in the adhesive layers (3) and the internal layer (4) in FIG. 1 should not be previously curved because they are ductile (have a greater capacity of deformation than the materials used in the strike-face layer (1) and intermediate layers (2) of FIG. 1 and thus do not break during lamination.)

In order to reduce the risk of generating large spacing between the strike-face layer (1) and intermediate layers (2) (FIG. 5), the bending of these glass or glass-ceramic layers generally is simultaneously performed using temperature and gravity in a process taking anywhere between 100 and 1000 minutes; during this process, glass and glass-ceramics are curved and also annealed. The time frames mentioned refer to the total residence time of the strike-face layer (1) and intermediate layers (2) inside the ovens in order to be simultaneously curved without experiencing ruptures due to thermal shock, since heating and cooling are carried out progressively. Materials swell when heated and contract when cooled, and thus glass and glass-ceramics must be heated and cooled at rates that do not cause abrupt volume changes. The maximum rate at which volume changes can be made in glass and glass-ceramics is determined by the thermal properties of each material. When glass or glass-ceramics break due to an excessively fast volume change, this is known as material failure due to thermal shock. If a given material is rapidly cooled but not sufficiently fast so as to cause rupture thereof, said material accumulates internal stresses because the molecules do not reach thermodynamic equilibrium. Based on the above, it is thus understandable that the time interval (100 to 1000 minutes) whereby glass and glass-ceramic curvature by means of gravity and temperature is done is quite extensive, given it will depend on the thermal properties of the material on hand. When cooling of glass and glass-ceramics is done sufficiently slowly in order for the material not to accumulate internal stresses, it is thus said that the material was annealed. During gravity and temperature bending, materials must be subject to their softening temperature in order to be curved.

Each type of glass and glass-ceramic contemplated as an option in the strike-face layer (1) and intermediate layers (2) (FIG. 1) have their own softening temperature. For example: Soda-Lime glass softening temperature is 715° C., Borosilicate glass softening temperature is 820° C., Alkali Aluminum silicate (SAS) softening temperature is 904° C.

Conventional manufacturing of bullet-proof composites is designed using the same material in the strike-face layer (1) and intermediate layers (2) (FIG. 1), in order for all layers to be simultaneously curved using the same temperature. The above process allows for layers to be curved and annealed at the same time using the same mold, and thus reducing the risk of spacing between layers, which cause ruptures. Said simultaneous bending-annealing process of layers is not recommended for materials whose softening temperatures are different since this reduces optic quality of materials by increasing the presence of markers having lesser softening temperatures, reduces bending process optimization since there is a need to wait for materials having greater softening temperature to acquire the final shape of the piece, and also, the risk of spacing between layers increases. On the other hand, the simultaneous bending-annealing of glass layers requires a slow cooling system (<10° C./minute) in order for the hot interfaces (contacting glass or glass-ceramic internal surfaces) to cool at rates similar to the cooling rate of the surfaces in contact with air; these temperature differences between glass/glass, glass/air, glass-ceramic/glass or glass-ceramic/air interfaces may cause undesirable internal tensions which also lead to ruptures. Again, the necessary time frames for bending-annealing of more than one glass or glass-ceramic layer by means of gravity and temperature requires time frames ranging from 100 to 1000 minutes.

Figure 6:
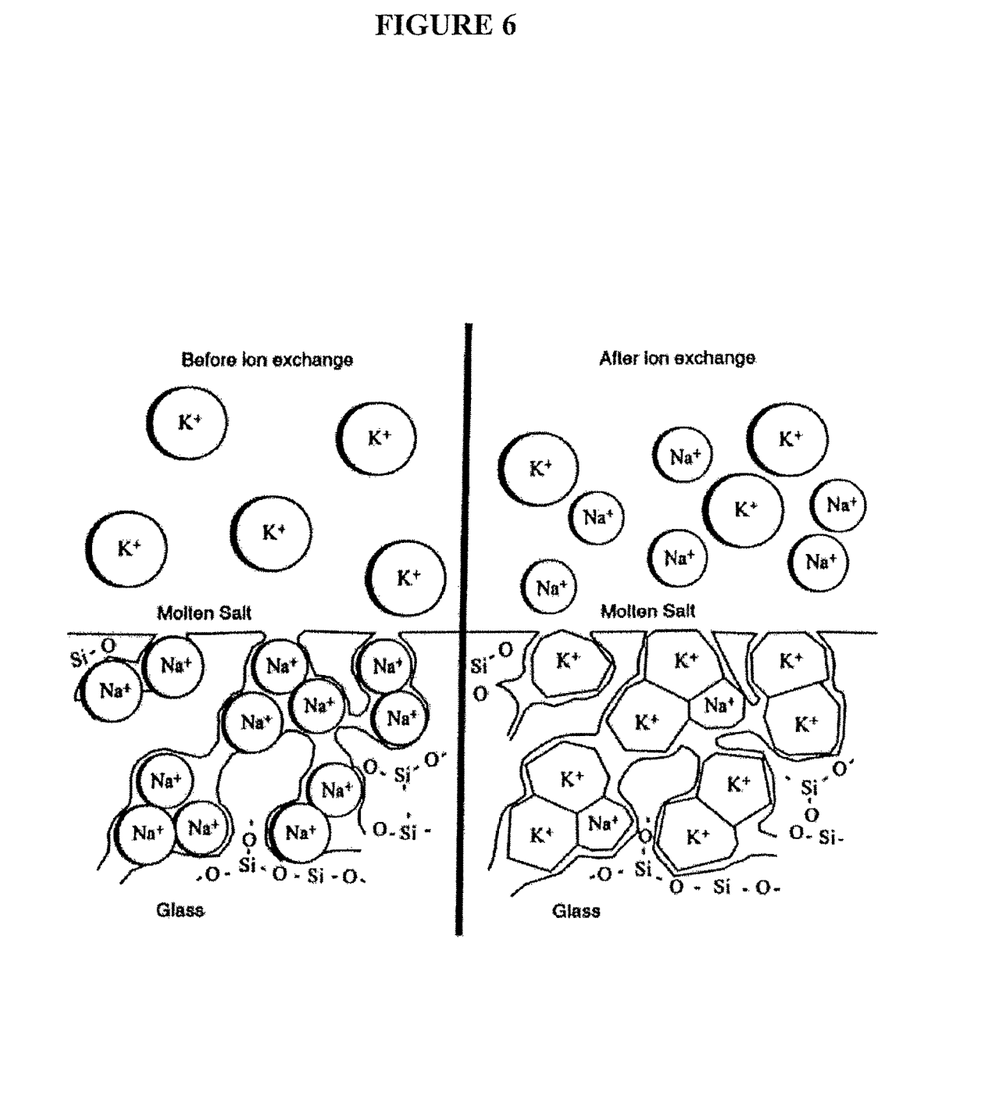
FIG. 6 illustrates sodium and potassium ion exchange between glass and a salt.

US2010/0275767, which discloses the production of bullet-proof glass using glass-ceramic in the strike-face layer (1) (FIG. 1) and at least one Soda-Lime or Borosilicate glass in the intermediate layers (2) (FIG. 1), does not explain how to solve the problem of bending glass and/or glass-ceramics using different softening temperatures without generating spacing between layers which could lead to ruptures. Therefore, applications using the concept illustrated in US2010/0275767 are reduced to flat pieces.

e) Carry out an ion exchange process of one or several glass and/or glass-ceramics of the strike-face layer (1)

and intermediate layers (2): ion exchange is a chemical process through which ions of a certain size are extracted from glass or glass-ceramic and other larger ones are introduced. The incorporation of larger ions into the molecular structure of glass and glass-ceramics generates compression stresses on the glass or glass-ceramic surface. The thickness of the compression stress generated is known as "case depth or Depth of Layer—DOL" and represents the depth reached by those larger ions through the glass or glass-ceramic surface. FIG. 6 illustrates potassium and sodium ion exchange between glass and a given salt[4]. Prior art discloses the relationship that exists between ion exchange and ballistic properties of glass and glass-ceramics.

[4] Varshneya, Chemical strengthening of glass lessons learned and yet to be learned, published in the Intenational Journal of Applied Glass Science, Volume 1, pages 131 to 142, 2010.

WO2007/032961 discloses the ways ion exchange has evolved and how this process may be used in bullet-proof composites. In addition, prior art also discloses how ion exchange increases mechanical resistance in glass and glass-ceramics percentage-wise over 200% making them more resistant to ruptures. However, no prior art is found which describes how ion exchange can increase flexibility of some types of glass and glass-ceramics to the point these materials may be included in bullet-proof composites without the need of bending them by means of gravity and temperature but solely mechanically during pressure and temperature lamination.

f) Assemble the strike-face layer (1), intermediate layers (2), adhesive layers (3) and the internal layer (4): in this step, the already curved strike-face layer (1) and intermediate layers (2) are placed in the order they will be laminated. Between these, the adhesive layers (3) are placed. As an internal layer (4), a flat or curved plastic sheet is placed. Afterwards, the materials are taken to the autoclave in the order they were placed in order to be pressure- and temperature-laminated.

g) Finally, pressure and temperature laminate the materials inside an autoclave. The materials are subject to pressure ranging between 0.69 and 1.03 MPa (100 and 150 psi) and temperature ranging from 85° to 135° C. which lead to the bonding of the strike-face layer (1), intermediate layers (2) and the internal layer (4) with the adhesive layers (3). In this step, the internal layer (4) is curved by means of pressure and temperature. However, it is also known that it is possible to laminate without pressure when EVA is used as adhesive (3)

In view of the above, it can be noted that prior art does not provide any information regarding the flexibility that ion exchange renders materials, and the way this property can be used in order for said materials to be mechanically curved during pressure and temperature lamination. In addition, prior art also does not disclose that composites in which one type of material is used in the strike-face layer (1) and a different material is used in the intermediate layers (2), are not destined to be used in curved bullet-proof composites. Finally, prior art also does not consider the possibility of carrying out individual bending of the intermediate layers (2) by means of a semi-tempered or heat strengthened bending process instead of an annealing-bending process.

4. BRIEF DESCRIPTION OF THE INVENTION

Figure 7A:
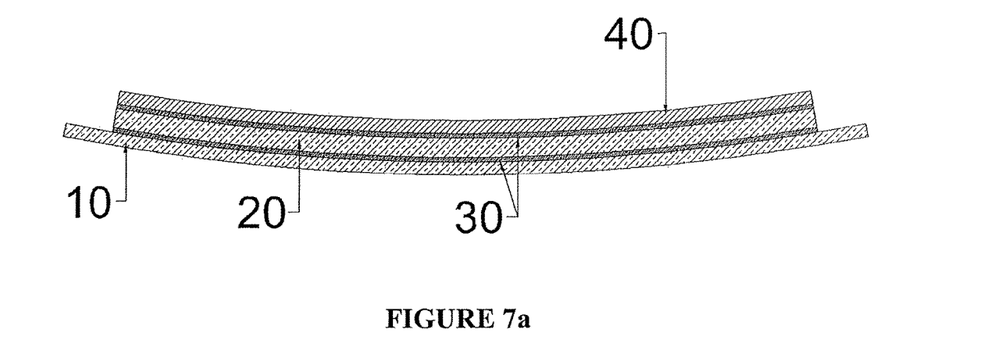
FIGS. 7a and 7b illustrate two embodiments of the present invention.
Figure 7B:
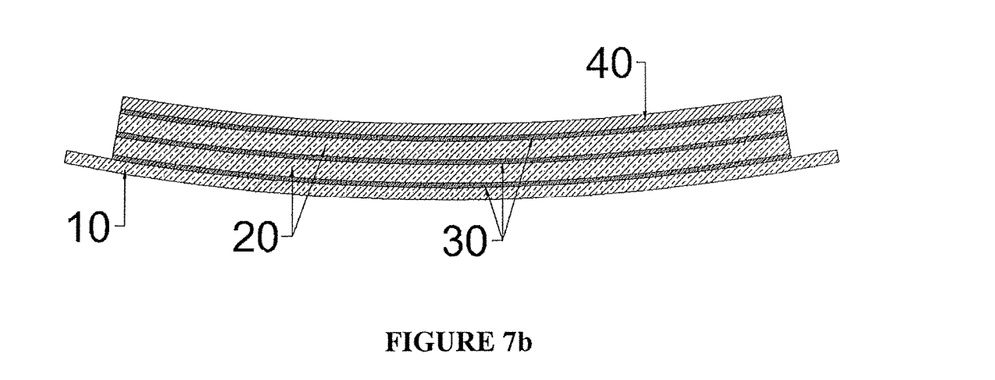

Referring to embodiments shown in FIGS. 7a and 7b, the present invention discloses a curved bullet-proof composite having glass, glass-ceramic or flexible ceramic in the strike-face layer (10) in order to be mechanically curved during a low heat (temperature) and pressure lamination process. The composites can be made of one or more gravity and heat-curved glass, glass-ceramic or ceramic layers in one or more intermediate layers (20). The purpose of the adhesive materials (30) and the plastic internal layer (40) is the same as the purpose described for the adhesive materials (3) and plastic internal layer (4) in prior art.

Figure 8:
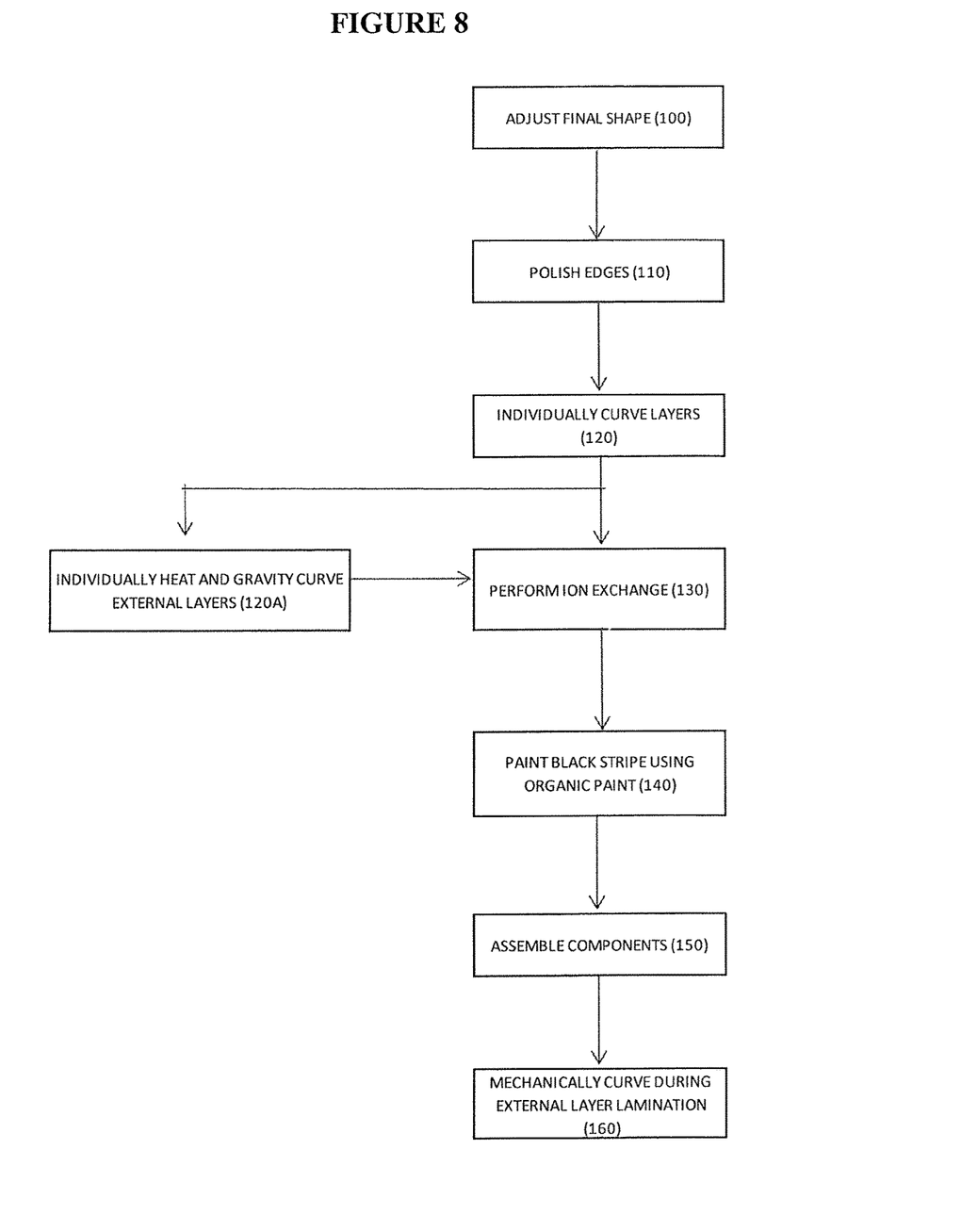
FIG. 8 illustrates the process steps of the present invention.

In addition, the present invention discloses a process for manufacturing the glass of the instant invention, comprising the following steps:

a) (100) size (cut) glass or glass-ceramic in the strike-face layer (10) and intermediate layers (20) to the geometry or shape of the curved bullet-proof composite. Sinter the ceramic material of the strike-face layer (10) according to the shape of the curved bullet-proof composite sought to manufacture.

b) (110) edge glass finishing, glass-ceramic or ceramic, i.e., strike-face layer (10) and intermediate layers (20);

c) (120) individually curve by means of gravity and temperature the glass or glass-ceramic intermediate layers (20);

d) (130) carryout an ion exchange process of one or several glass and/or glass-ceramics of the strike-face layer (10) and intermediate layers (20);

e) (140) paint the black stripe using organic paint on the strike-face layer (10) and/or one of the intermediate layers (20);

f) (150) assemble the strike-face layer (10), intermediate layers (20), adhesive materials (30) and the internal plastic layer (40); and g) (160) mechanically curve during pressure and heat lamination the strike-face layer (10), intermediate layers (20), adhesive materials (30) and the internal plastic layer (40).

5. DETAILED DESCRIPTION OF THE INVENTION

Manufacturing of flat bullet-proof glass using glass-ceramic materials in the strike-face layer (1) and borosilicate, pure silica and "silica glass" glass in the intermediate layers (2) (FIG. 1) is already disclosed in US patent application 2010/0275767. However, prior art does not solve the problem of material bending using different softening temperatures, as far as having adequate parallelism between the strike-face layer (10) and intermediate layers (20) (FIG. 5) and avoid spacing which leads to ruptures during a heat and pressure lamination process.

5.1. Product

The present invention resolves the problem of manufacturing curved bullet-proof glass when glass, glass-ceramic or sufficiently flexible ceramic is used in the strike-face layer (10) of the bullet-proof composite in order to be mechanically curved during a heat and pressure lamination process normally performed in a range between 0 and 1.52 MPa (0 and 220 psi) and a temperature range between 80 and 140° C.

In addition, the present invention resolves the problem of manufacturing bullet-proof composites which incorporate glass, glass-ceramics or ceramics in the strike-face layer (10) having a softening temperature different to that of glass, glass-ceramics or ceramics used in intermediate layers (20) (FIG. 7). Given the ion exchange process of the present invention, which will be detailed below, the material selected in the strike-face layer (10) acquires the necessary flexibility for adopting the curvature given to the intermediate layers (20) by gravity and temperature without the need of using other temperature and pressure ranges during the autoclave process.

Referring to FIG. 7a, the curved bullet-proof composite of the present invention may be made of an strike-face layer (10), at least one intermediate layer (20), and one internal plastic layer (40), bonded by adhesive materials (30). When referring to "one element", or "one layer" or "one material", it necessarily should be understood to include the possibility to be one or more from those elements. In a preferred embodiment of the invention, the preferred material to be used in the strike-face layer (10) is an alkali aluminosilicate with ion exchange. It should be understood that the group of alkali aluminosilicate materials comprises lithium aluminosilicate, sodium aluminosilicate or any other aluminosilicate material taken from the group of alkali materials.

In the present invention, the amount of sodium oxide ($Na_2O$) or any other oxide including sodium (Na) in its chemical formula may range between 0 and 30%. In a preferred embodiment, the chemical composite suggested for sodium aluminosilicate (SAS) may be $SiO_2$ 61%, $Al_2O_3$ 16%, $B_2O_3$<1%, $Na_2O$ 13%, $K_2O$ 4%, CaO<1% and MgO 4% or any other which allows said material to acquire the necessary flexibility and mechanical resistance after the ion exchange process to be curved during the lamination process without breaking. In the preferred embodiment shown in FIG. 7a, the thickness of the strike-face layer (10) may be preferably lesser or equal to 3 mm (≤3 mm), the depth reached during the ion exchange process (DOL) greater or equal to 30 μm (≥30 μm) and the compression stress equal or greater than 300 MPa (≥300 MPa).

Another preferred material for use in the strike-face layer (10) is Lithium Aluminosilicate (LAS) with ion exchange. In the present invention, the amount of lithium oxide ($LiO_2$) or any other oxide including lithium (Li) in its chemical formula may range between 0 and 20%. In a preferred embodiment, the chemical composite suggested for lithium aluminosilicate (LAS) may be $SiO_2$ 67.2%, $Al_2O_3$ 20.1%, $LiO_2$ 3.2%, MgO 1.1%, CaO 0.05%, BaO 0.9%, ZnO 1.7%, $Na_2O$ 0.4%, $K_2O$ 0.3%, $TiO_2$ 2.7% and $ZrO_2$ 1.7% or any other which allows said material to acquire the necessary flexibility and mechanical resistance after the ion exchange process to be curved during the lamination process without breaking. In the preferred embodiment shown in FIG. 7a, the thickness of the strike-face layer (10) may be preferably lesser or equal to 3 mm (≤3 mm), the depth reached during the ion exchange process (DOL) greater or equal to 50 μm (≥50 μm) and the compression stress equal or greater than 400 MPa (≥400 MPa).

An important scratch resistant improvement is achieved when a chemical strengthened glass or glass-ceramic is used as strike-face layer (1) in bullet-proof composites because the compressive stresses incorporated to glass or glass-ceramics makes more difficult that scratches can be generated. Additionally, compressive stresses could avoid or retard the propagation of preexisting cracks on strike-face layer, as a result of it; the fracture of this layer could be prevented. For example, soda-lime glass could have depth of layer around 25 to 30 microns and compressive stresses between 400 and 600 MPa. So with the incorporation of new materials like alkali aluminosilicates and lithium aluminosilicates as strike-face layer in (1) in which DOL could be up to 1000 microns and compressive stresses up to 1000 MPa, the possibilities of fractures or scratches on strike-face layer are reduced.

In other curved bullet-proof composites of the present invention, the use of Soda-Lime glass having ion exchange in the strike-face layer (10) is possible. In the instant invention, the minimum content of silicon oxide ($SiO_2$) or any other oxide including silicon (Si) in its chemical formula can be 50%. In a preferred embodiment of the present invention, the chemical composite of Soda-Lime glass can be 73% $SiO_2$, 14% $Na_2O$, 9% CaO, 4% MgO, 0.15% $Al_2O_3$, 0.03% $K_2O$, 0.02% $TiO_2$ and 0.1% $Fe_2O_3$ or any other which allows said material, after being subject to ion exchange, to acquire flexibility and mechanical resistance necessary for bending during the lamination process. The thickness of the material used in the strike-face layer (10) may be lesser or equal to 3 mm (≤3 mm), the depth reached during the ion exchange process (DOL) greater or equal to 15 μm (≥15 μm) and the compression stress equal or greater than 200 MPa (≥200 MPa).

In other curved bullet-proof composites of the present invention, the use of Borosilicate glass having ion exchange in the strike-face layer (10) is possible. In the instant invention, the minimum content of boron trioxide ($B_2O_3$) or any other oxide including boron (B) in its chemical formula range between 0 and 25%. In a preferred embodiment of the present invention, the chemical composite of Borosilicate glass can be 81% $SiO_2$, 4% $Na_2O/K_2O$, 2% $Al_2O_3$, 13% $B_2O_3$, or any other which allows said material, after being subject to ion exchange, to acquire flexibility and mechanical resistance necessary for bending during the lamination process. The thickness of the material used in the strike-face layer (10) may be lesser or equal to 3 mm (≤3 mm), the depth reached during the ion exchange process (DOL) greater or equal to 5 μm (≥5 μm) and the compression stress equal or greater than 100 MPa (≥100 MPa).

Alkali Aluminosilicate (SAS), Lithium Aluminosilicate (LAS), Soda-Lime and Borosilicate may be used in the strike-face layer (10) having a thickness greater than 3 mm (>3 mm). However, in these cases, the bending of said layer is not performed under pressure and heat (0 to 1.52 MPa; 80-140° C.) during lamination but instead individually by means of gravity and temperature during the bending process.

The preferred materials for use in the intermediate layers are Soda-Lime glass with or without ion exchange, borosilicate glass and fused silica ($SiO_2$ content >95%). However, the use of preferred materials of the strike-face layer (10) in the intermediate layers (20) is possible in other embodiments.

Figure 2:
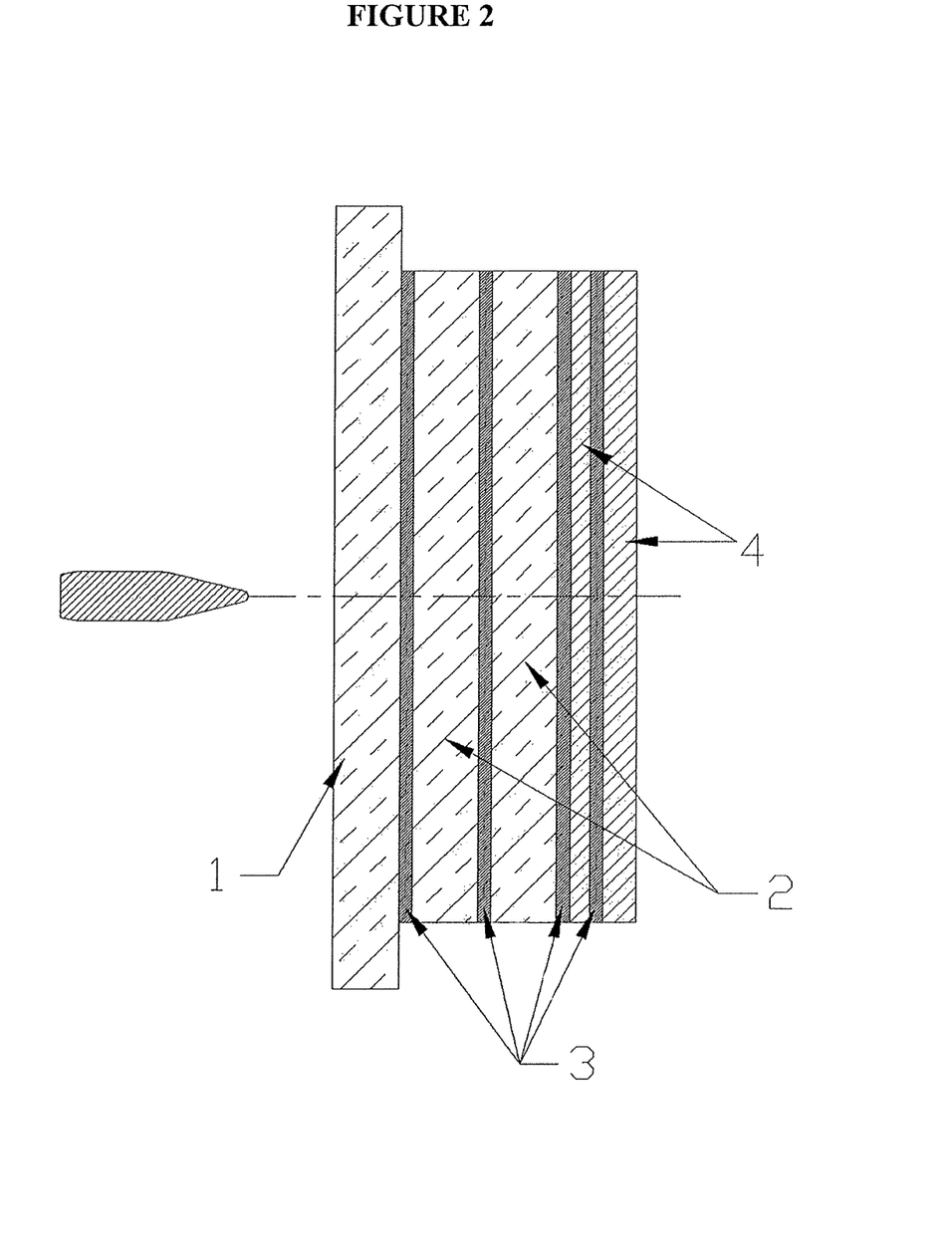
FIG. 2 shows a cross section of an example of a design of a transparent glass bullet-proof composite in which two layers of plastics are used in (4).

Alternatively, the design of bullet-proof composites could incorporate several layers of one or different plastics as internal layers (4). FIG. 2 shows a configuration in which two layers of plastic are used. The article "Ballistic Properties of Hybrid Systems for Transparent Armor Applications" wrote by John W. Song et al reveals the synergistic effect of incorporate combinations of hard/soft plastics as spall shield in position (4) of FIG. 2. So that, with the incorporation of this hybrid concept a ballistic performance improvement of bullet-proof composites with same areal density is obtained.

5.2. Process

As noted above, the art describes in detail the critical steps of the manufacturing process of curved bullet-proof glass using Soda-Lime or Borosilicate glass in the strike-face glass layer (1) and the intermediate layers (2) (FIG. 1), as mentioned above.

Making reference to FIG. 8, the method through which the curved bullet-proof composites of the present invention are produced is described. The steps are:

a) (100) size (cut) glass or glass-ceramic in the strike-face layer (10) and intermediate layers (20) to the geometry or shape of the curved bullet-proof composite. Sinter the ceramic material of the strike-face layer (10) according to the shape of the curved bullet-proof composite sought to manufacture.

b) (110) edge glass finishing, glass-ceramic or ceramic, i.e., strike-face layer (10) and intermediate layers (20);

c) (120) individually curve by means of gravity and temperature the glass or glass-ceramic intermediate layers (20);

d) (130) carryout an ion exchange process of one or several glass and/or glass-ceramics of the strike-face layer (10) and intermediate layers (20);

e) (140) paint the black stripe using organic or inorganic paint on the strike-face layer (10) and/or one of the intermediate layers (20);

f) (150) assemble the strike-face layer (10), intermediate layers (20), adhesive materials (30) and the internal plastic layer (40); and g) (160) mechanically curve during pressure and heat lamination the strike-face layer (10), intermediate layers (20), adhesive materials (30) and the internal plastic layer (40).

As can be noted, the differences with prior art lie partly in the order of steps c), e) and g); i.e., they present modifications and change their order in order to make possible the production of curved bullet-proof glass which involves glass or glass-ceramics in the strike-face layer (10) different to the glass or glass-ceramics used in the intermediate layers (20). Steps c), e) and g) of the subject invention will be described in detail and the modifications contemplated in each step thereof.

c) Individually curve by means of gravity and temperature the glass or glass-ceramic (120) intermediate layers (20): as mentioned in prior art, the bending of the glass and glass-ceramic layers is performed simultaneously (bending-annealing) in order to assure parallelism. The process may take anywhere between 100 and 1000 minutes because it requires a slow cooling system in order to allow for the glass/glass, glass/glass-ceramic or glass-ceramic/glass-ceramic interfaces, which cool slower than the glass/air or glass-ceramic/air interfaces, to have lesser cooling rates than the maximum temperature gradient allowed by the material in order to avoid failures due to thermal shock. Simultaneous bending of glass or glass-ceramic layers force bullet-proof manufacturers to design ballistic formulas having the same materials both in the strike-face layer (10) and the intermediate layers (20) in order to have the same softening temperature in the materials during simultaneous bending by means of gravity and temperature, thereby reducing the presence of optic defects due to excess markings during the bending process which happens when materials having different softening temperatures are simultaneously curved.

The present invention resolves the problem of lack of parallelism between glass or glass-ceramic layers used in intermediate layers (20) and which must be curved by means of gravity and temperature upon performing the individual curvature of each layer in a horizontal heat tempering furnace where pieces are curved and semi-tempered or heat strengthened individually, in such a way that hot glass/glass, glass-ceramic/glass or glass-ceramic/glass-ceramic interfaces are eliminated when more than one layer is curved. The parallelism of intermediate layers (20) is assured by the use of special mold which allow for better control of the shape of the glass or glass-ceramic layers to be used in the intermediate layers (20) during the bending/semi-tempering or heat strengthened process. The above allows for the time required in the temperature and gravity bending process to be reduced in a way that curved bullet-proof glass production time is reduced and costs related with bending of intermediate layers (20) are optimized. Therefore, production capacity and energy savings increase in the production of curved bullet-proof pieces.

The bending/semi-tempering or heat strengthened process performed when bending the layers of material used in intermediate layers (20) individually, allows for fragments of these curved/semi-tempered or heat strengthened materials to be of similar size to those obtained from curved-annealed materials (simultaneous bending of layers). The above is important in order not to lose resistance capacity to multiple impacts, which is very relevant when designing bullet-proof composites.

e) Paint the black stripe (140) using organic or inorganic paint on the strike-face layer (10) and/or one of the intermediate layers (20): in prior art, the production of the perimeter black stripe required in bullet-proof composites having glass enamels and which generally are located on the glass used in the strike-face layer (10) reduces mechanical resistance of the glass in percentages greater than 60%. The above forces bullet-proof glass manufacturers to design the bullet-proof composites with thick glass in the strike-face layer (10). In addition, how ion exchange increases mechanical resistance of glass and glass-ceramics is known.

In order to avoid the loss of mechanical resistance in glass and glass-ceramics having ion exchange used in the strike-face layer (10), it is necessary to make the perimeter black stripe with organic paint which does not reduce said mechanical properties in glass or glass-ceramics used in the strike-face layer (10).

g) Pressure and heat laminate the strike-face layer (10), intermediate layers (20), adhesive materials (30) and the internal plastic layer (40) and mechanically curve by means of pressure and temperature the strike-face layer (10) of material with ion exchange and the internal plastic layer (40): The bending-annealing process of the strike-face layer (10) and of the intermediate layers (20) is generally performed simultaneously by means of gravity and temperature. However, it was explained how this simultaneous bending process requires that the materials to be used in the strike-face layer (10) and intermediate layers (20) be the same in order to avoid lack of parallelism amongst layers and avoid optic defects produced by excess markings when materials having different softening temperatures are simultaneously curved.

The present invention takes advantage of the greater mechanical resistance and flexibility that the ion exchange process imparts to glass and glass-ceramics in order to incorporate them into the strike-face layer (10) of bullet-proof glass. Therefore, materials that will be used in the strike-face layer (10) may be introduced flat into the pressure and heat lamination process, which generally may range between 0 and 1.52 MPa and between 80 and 140° C. During the lamination process, the isobaric pressure inside the autoclave forces the materials of the strike-face layer (10) to take on the curvature of the previously curved and semi-tempered or heat strengthened material of the intermediate layers (20).

Example 1

FIG. 7a illustrates a composite which uses Alkali Aluminosilicate (SAS), Lithium Aluminosilicate (LAS) or Soda-Lime having a thickness ranging between 2 and 3 mm with ion exchange in the strike-face layer (10) mechanically curved during the heat and pressure lamination process, a borosilicate glass layer having a thickness ranging between 9 and 13 mm in the intermediate layers (20) without ion exchange and curved/semi-tempered or heat strengthened by means of gravity and temperature, a polycarbonate layer having a thickness ranging between 1 and 3 mm in the internal plastic layer (40) and polyurethane adhesive layers (30) with a thickness ranging from 0.3 to 3.1 mm. The described composite complies with requirements set forth in NIJ 0108.01 for level III A with a thickness ranging from 14 to 17 mm; the standard formula used to comply with level III A requirements of the same norm has a thickness of 21 mm and therefore, thickness and weight reduction can range between 19 and 33%, preferably a weight reduction of 29% and a thickness reduction of 26%. In addition, the individual bending/semi-tempering or heat strengthened process of the intermediate layers (20) can be performed 10 times faster than simultaneous bending-annealing, and thus represents energy and cost savings in the production of bullet-proof glass and an increase in production of curved bullet-proof composites.

Example 2

FIG. 7a illustrates a composite which uses Alkali Aluminosilicate (SAS), Lithium Aluminosilicate (LAS) or Soda-Lime having a thickness ranging between 2 and 3 mm with ion exchange in the strike-face layer (10), a Soda-Lime glass layer having a thickness ranging between 8 and 14 mm in the intermediate layers (20) with ion exchange and curved/semi-tempered or heat strengthened by means of gravity and temperature, a polycarbonate layer having a thickness ranging between 1 and 3 mm in the internal plastic layer (40) and polyurethane adhesive layers (30) with a thickness ranging from 0.3 to 3.1 mm. The described composite complies with requirements set forth in NIJ 0108.01 for level III A with a thickness ranging from 14 to 18 mm; the standard formula used to comply with level III A requirements of the same norm has a thickness of 21 mm and therefore, thickness and weight reduction can range between 0 and 30%.

Example 3

FIG. 7b illustrates a composite which uses Alkali Aluminosilicate (SAS), Lithium Aluminosilicate (LAS) or Soda-Lime having a thickness ranging between 2 and 3 mm with ion exchange in the strike-face layer (10), two layers of borosilicate glass having a thickness ranging between 5 and 13 mm in the intermediate layers (20) without ion exchange and curved/semi-tempered or heat strengthened by means of gravity and temperature, a polycarbonate layer having a thickness ranging between 1 and 6 mm in the internal plastic layer (40) and polyurethane adhesive layers (30) with a thickness ranging from 0.3 to 3.1 mm. The described composite complies with requirements set forth in NIJ 0108.01 exceeding level III A and offers thickness and weight reduction ranging between 20 and 35%.

The above comprises a complete and detailed disclosure of several embodiments of the inventive concept herein claimed. Any skilled person in the art shall understand that variations may exist without falling away from the scope and spirit of the invention. The inventive concept claimed herein is only defined by the scope of the following claims, which shall be interpreted according to what was disclosed in the detailed description.

The invention claimed is:

1. A process for bending a bullet-proof composite comprised of one alkali aluminosilicate or soda-lime silicate glass strike-face layer which has been subjected to an ion exchange process to obtain enough flexibility to be mechanically curved, and having a thickness less or equal to 3mm, one or more glass or glass-ceramic intermediate layers, one internal plastic layer and an adhesive material between each of the above layers, comprising the steps of:

(a) individually bending by means of gravity and temperature the glass or glass-ceramic intermediate layers; and (b) mechanically bending the glass strike-face layer and the internal plastic layer by laminating by heat and pressure the glass strike-face layer, the glass or glass-ceramic intermediate layers from step (a), the adhesive materials and the internal plastic layer;

wherein the softening point temperature of the glass-strike face layer is higher than the softening point temperature of the glass or glass-ceramic intermediate layers of the bullet-proof composite;

wherein the lamination temperature from step (b) is less than the bending temperature from step (a); and wherein the glass strike-face layer corresponds to the convex side of the bullet-proof composite.

2. The process of claim 1, wherein the glass or glass-ceramic intermediate layers have been subjected to an ion exchange process.

3. The process of claim 1, wherein a step (c) is carried out after step (a), and consists of painting around the glass strike-face layer with black organic or inorganic paint.

4. The process of claim 3, wherein the painting with black organic paint or inorganic is done over the glass or glass-ceramic intermediate layers.

5. The process of claim 1, wherein the step (b) of heat and pressure mechanically bending is performed at a pressure ranging from 0.68 to 1.03 MPa.

6. The process of claim 1, wherein the step (b) of heat and pressure mechanically bending step is performed at a temperature ranging from 85° C. to 135° C.

* * * * *